United States Patent [19]
Seo

[11] Patent Number: 6,039,255
[45] Date of Patent: Mar. 21, 2000

[54] DATA SYMBOL READING APPARATUS

[75] Inventor: Shuzo Seo, Tokyo, Japan

[73] Assignee: Asahi Kogaku Kogyo Kabushiki Kaisha, Tokyo, Japan

[21] Appl. No.: 08/917,469

[22] Filed: Aug. 26, 1997

[30] Foreign Application Priority Data

Aug. 28, 1996 [JP] Japan .................................. 8-244018

[51] Int. Cl.⁷ .................................................. G06K 7/10
[52] U.S. Cl. ...................................................... 235/462.35
[58] Field of Search ........................... 255/462.2, 462.21, 255/462.35, 462.42, 462.01, 462.08, 462.09, 462.1, 462.17, 462.22, 462.23, 462.24, 462.41; 359/707, 625, 626

[56] References Cited

U.S. PATENT DOCUMENTS

5,572,006  11/1996  Wang et al. ............................. 235/454
5,694,235  12/1997  Kajiki ...................................... 359/202
5,734,153   3/1998  Swartz et al. ........................... 235/472
5,812,322   9/1998  Meyers .................................... 359/621
5,877,487   3/1999  Tani et al. ............................... 235/469

*Primary Examiner*—Donald Hajec
*Assistant Examiner*—Daniel H. Sherr
*Attorney, Agent, or Firm*—Greenblum & Bernstein P.L.C.

[57] ABSTRACT

A data symbol reading apparatus, for reading an encoded data symbol, includes: an image pickup element; an image forming optical system for forming an image of the encoded data symbol located within a symbol read area onto a light-receiving surface of the image pickup element; and an illumination system. The illumination system includes a plurality of light sources, a diffusion plate for diffusing light emitted from the light sources, and a lens member for transmitting diffused light diffused by the diffusion plate onto the symbol read area. The plurality of light sources, the diffusion plate, and the lens member are arranged such that a light distribution within the symbol reading area is almost uniform.

23 Claims, 6 Drawing Sheets

DATA SYMBOL READING APPARATUS

BACKGROUND OF THE INVENTION

The present invention relates to a data symbol reading apparatus for reading coded information, such as a data symbol, and, in particular, to a non-contact type data symbol reading apparatus. That is, a data symbol reading apparatus that is not brought into contact with a plane of the data symbol in the reading process. The present invention is particularly applicable to a data symbol reading apparatus for reading a two-dimensional data symbol, such as, a monochrome mosaic pattern.

In general, when a data symbol is to be read, the data symbol reading apparatus is brought into contact with a surface on which the two-dimensional data symbol is formed. The apparatus is arranged such that, in this position, an image of the data symbol is formed on a CCD (Charge Coupled Device) by an imaging lens. This arrangement is referred to as a contact type data symbol reading apparatus.

However, in order to increase the range of use of a data symbol reading apparatus, recent designs have been directed to a non-contact type data symbol reading apparatus in which the data symbol reading apparatus does not have to be brought into contact with the surface on which the two-dimensional data symbol is formed.

The non-contact type data symbol reading apparatus has the problem that, because there is no contact with the surface, the data symbol may not be sufficiently illuminated to provide an accurate reading. This problem is particularly important in the case of reading a two-dimensional data symbol which carries more information than a conventional bar-code data symbol in a similar area.

Further, if a more intense light source is used, the illumination of the data symbol may be non-uniform, also causing problems with the accuracy of reading the data symbol.

SUMMARY OF THE INVENTION

It is therefore an object of the present invention to provide an improved data symbol reading apparatus which provides sufficient and uniform illumination to a symbol read area.

According to one aspect of the present invention, there is provided, an illuminating system for a symbol reading apparatus having an image pickup element and an image forming optical system for forming an image of a symbol located within a symbol read area onto a light-receiving surface of the image pickup element. The illuminating system includes: a plurality of light sources; a diffusion plate for diffusing light emitted by the light sources; and a lens member for transmitting diffused light diffused by the diffusion plate onto the symbol read area. In particular, the plurality of light sources, the diffusion plate, and the lens member are arranged such that light distribution within the symbol reading area is almost uniform. Thus, with this illuminating system, it is expected that the image of the symbol can be captured correctly.

In a particular case, the plurality of light sources are arranged on a plane that is perpendicular to an optical axis of the image forming optical system.

In another particular case, the diffusion plate is perpendicular to an optical axis of the image forming optical system, and a distance between the diffusion plate and the lens member is approximately equal to a focal length of the lens member. Accordingly, the diffused light is projected towards the symbol read area as parallel beams.

In yet another particular case, a transparent portion is formed on the diffusion plate and light from the symbol read area passes through the transparent portion to be incident on the image forming optical system. The transparent portion may be an opening. Further, in this case, the plurality of light sources may be arranged to be symmetrical with respect to an optical axis of the image forming optical system.

In yet another particular case, the lens member includes a plurality of lenses. The number of the plurality of lenses is equal to the number of the plurality of light sources. The plurality of light sources and the plurality of lenses are arranged on opposite sides of the diffusion plate.

In yet another particular case, the diffusion plate is a plate having a coarse surface.

According to another aspect of the present invention, there is provided, an image capture apparatus, for capturing an image of a target area. The apparatus includes: an image capture element; an illumination system that illuminates the target area for image capture; and an image-forming optical system that forms an image of the target area on the image capture element. In particular, the illumination system includes: a plurality of light sources; a diffusion plate for diffusing light emitted by the light sources; and a lens member for transmitting diffused light diffused by the diffusion plate onto the target area. The plurality of light sources, the diffusion plate, and the lens member are arranged such that light distribution within the target area is almost uniform. Because the illuminating system can illuminate the symbol read area uniformly, the image of the target area can be correctly captured.

In a particular case, a transparent portion is formed on the diffusion plate and light from the target area passes through the transparent portion to be incident on the image forming optical system. In this case, the plurality of light sources may be arranged to be symmetrical with respect to an optical axis of the image forming optical system.

In another particular case, the lens member includes a plurality of lenses arranged on a plane perpendicular to an optical axis of the image forming optical system. The number of the plurality of lenses is equal to the number of the plurality of light sources. The plurality of light sources and the plurality of lenses are arranged to face each other with the diffusion plate disposed therebetween.

In yet another particular case, the diffusion plate is a plate having a coarse surface.

According to yet another aspect of the present invention, there is provided, a data symbol reading apparatus, for reading an encoded data symbol. The apparatus includes: an image pickup element; an image forming optical system for forming an image of the encoded data symbol located within a symbol read area onto a light-receiving surface of the image pickup element; and an illumination system. The illumination system has a plurality of light sources, a diffusion plate for diffusing light emitted from the light sources, and a lens member for transmitting diffused light diffused by the diffusion plate onto the symbol read area. The plurality of light sources, the diffusion plate, and the lens member are arranged such that light within the symbol reading area is almost uniformly distributed. Specifically, a positional relationship between the light sources and the diffusion plate may be determined such that the luminance distribution on the diffusion plate is substantially uniform. Further more the lens member is arranged such that the symbol read is illuminated evenly. With this symbol reading device, it can be expected that the image of the data symbol is captured correctly.

In a particular case, the plurality of light sources are arranged on a plane that is perpendicular to an optical axis of the image forming optical system.

In another particular case, the encoded data symbol reading apparatus further includes an index display device for displaying an index for setting a distance to the encoded data symbol.

In yet another particular case, the lens member includes a plurality of lenses, equal to the number of light sources. The light sources and the lenses are arranged in a one-to-one relationship.

In this case, the lenses are arranged to be symmetrical with respect to an optical axis of the image forming optical system on a surface perpendicular to the optical axis. Optical axes of lenses located farther from the optical axis of the image forming optical system do not coincide with optical axes of corresponding ones of the plurality of light sources.

In yet another particular case, the light sources are arranged to be symmetrical with respect to an optical axis of the image forming optical system on a surface perpendicular to the optical axis. Light sources arranged away from the optical axis have an arrangement interval smaller than that of light sources arranged closer to the optical axis.

In the above cases of this aspect, the diffusion plate may be a plate having a coarse surface. Also, the encoded data symbol may be a two-dimensional tessellated symbol. Further, the encoded data symbol reading apparatus may further include a decoding device that decodes the encoded data symbol.

DETAILED DESCRIPTION OF THE PREFERRED EMBODIMENTS

A data symbol reading apparatus according to the present invention will be described with reference to preferred embodiments shown in the accompanying drawings.

Figure 1:
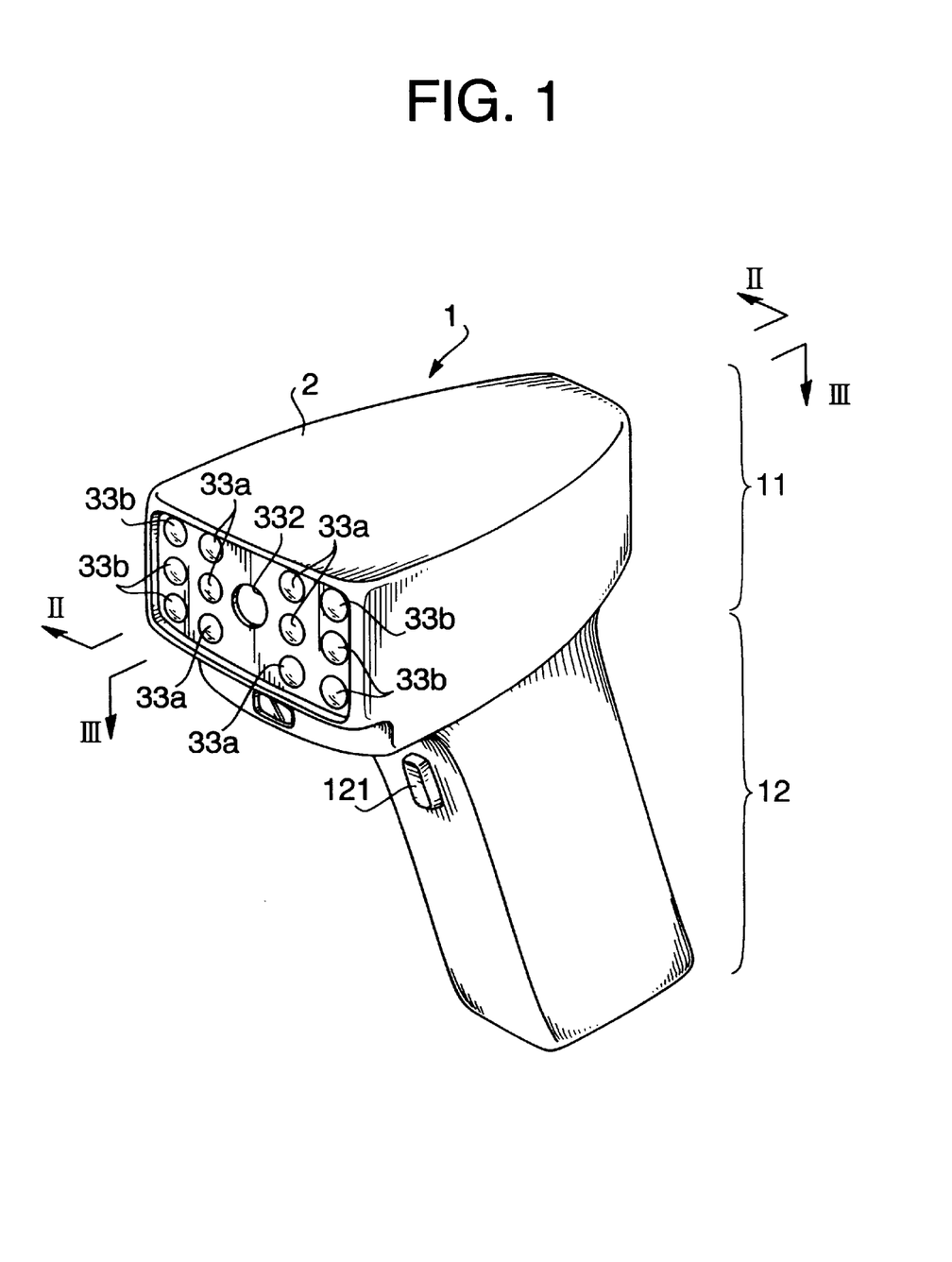
FIG. 1 is a perspective view showing a data symbol reading apparatus according to an embodiment of the present invention.
Figure 2:
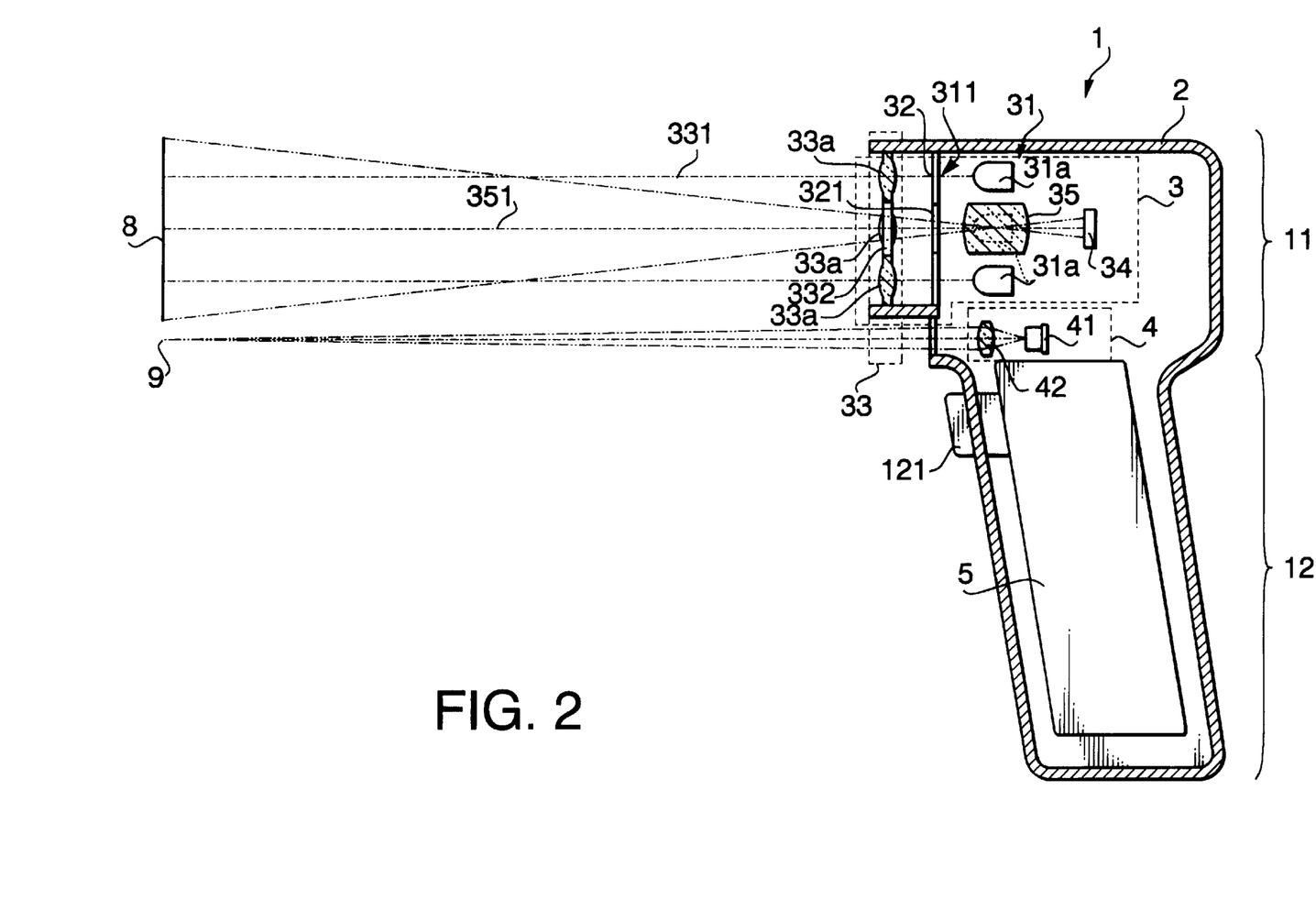
FIG. 2 is a sectional view taken along line II—II of FIG. 1.
Figure 3:
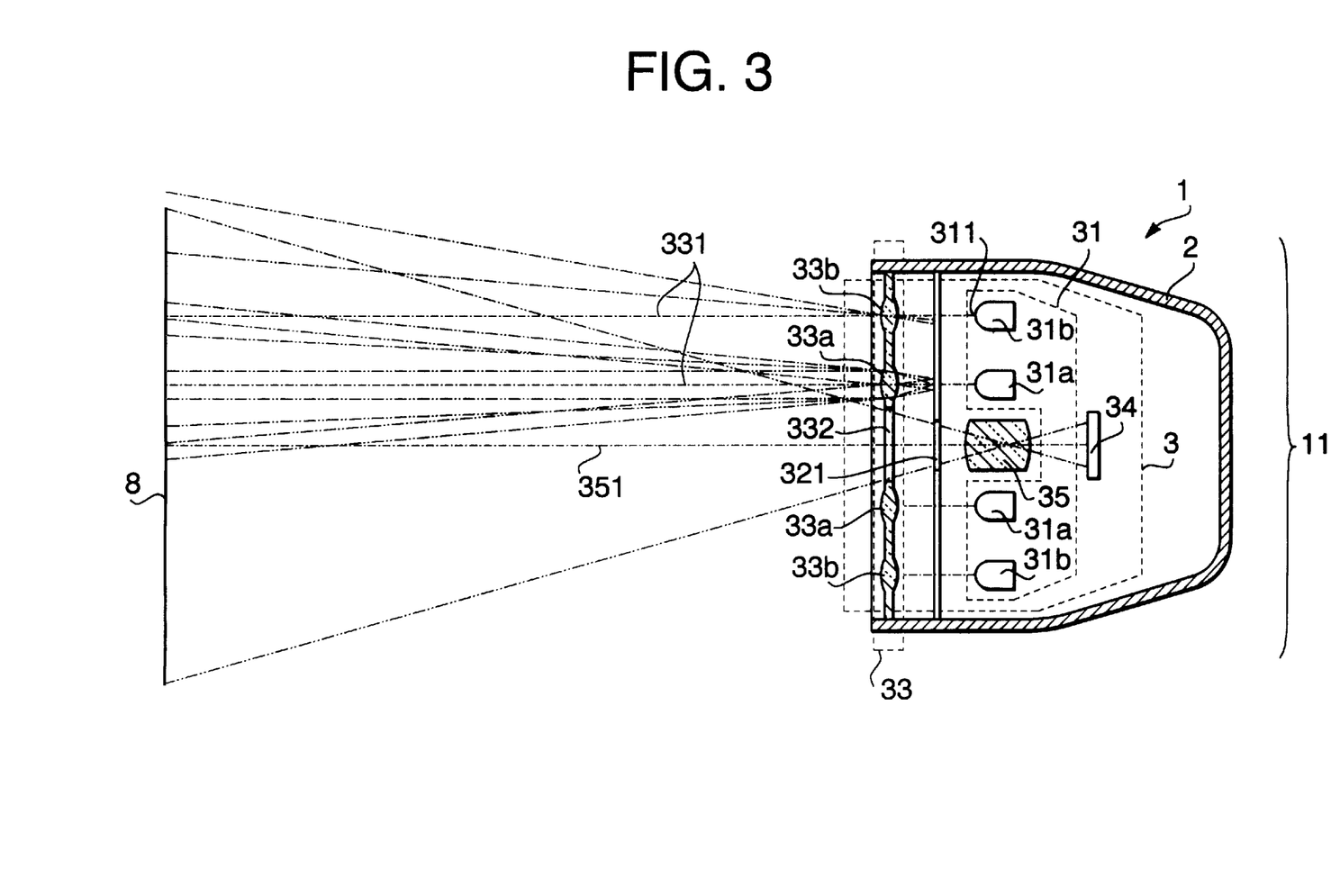
FIG. 3 is a sectional view taken along line III—III of FIG. 1.

FIG. 1 is a perspective view of a data symbol reading apparatus 1 according to an embodiment of the present invention. FIGS. 2 and 3 are sectional views of the data symbol reading apparatus 1 taken along lines II—II and III—III of FIG. 1, respectively.

As shown in FIG. 1, the data symbol reading apparatus 1 includes a casing 2. The casing 2 includes a longitudinal grip portion 12, which is gripped with a hand, and a head portion 11 formed at an end of the grip portion 12.

As shown in FIGS. 2 and 3, the grip portion 12 is provided with a trigger switch 121, for starting a reading operation, and houses a processing section 5 for processing an image that has been read. Further, the head portion 11 houses a reading section 3, for reading an image of a data symbol, and an index projection section 4 for projecting an index point 9 used in distance determination (described below).

The reading section 3 includes a light source unit 31 for emitting illumination light, a diffusion plate 32 for diffusing light emitted from the light source unit 31, a lens unit 33 for transmitting the diffused light, an image pickup element 34, and an image pickup lens 35 to form an image of a predetermined symbol read area 8 on a light-receiving surface of the image pickup element 34.

The light source unit 31 includes a plurality of light sources 31a and 31b, for example, light-emitting elements such as LEDs, halogen lamps, or the like. The light sources 31a and 31b are symmetrically arranged with respect to an optical axis 351 of the image pickup lens 35 on a surface perpendicular to the optical axis 351 of the image pickup lens 35. In this embodiment, the luminance of each of the light sources 31a and 31b is preferably equal.

In particular, the light sources 31a are placed close to the image pickup lens 35. The light sources 31b are placed outside of the light sources 31a. Further, in this embodiment, a distance between the light sources 31a is determined in accordance with the power of the light sources 31a and a predetermined distance to the symbol read area 8. Also, since the lens 35 is arranged at the center of the plane on which the light sources 31a are arranged, the distances between the light sources 31a cannot be made shorter than a predetermined amount. However, a distance between the light sources 31b and the light sources 31a at each side of the optical axis 35 may be set shorter than the predetermined amount in order to reduce the size of the head portion 11.

The diffusion plate 32 is, for example, a plate having a coarse surface that diffuses light and may be a ground glass plate. An opening 321 is formed in the diffusion plate 32 around the optical axis 351 of the image pickup lens 35 in order to allow image-forming light to pass through without being diffused.

The lens unit 33 is formed with a plurality of lenses 33a and 33b corresponding to the light sources 31a and 31b in a one-to-one relationship. The lenses 33a and 33b are arranged on a surface perpendicular to the optical axis 351 of the image pickup lens 35. Similar to the diffusion plate 32, an opening 332 is formed in the lens unit 33 around the optical axis 351 of the image pickup lens 35.

The opening 321 and the opening 332 are formed so that an image of the symbol read area and a sufficient amount of light can be transmitted to the CCD 34.

In the present invention, in order to provide illumination light having uniform and sufficient luminance onto the symbol read area 8, the light source unit 31, the diffusion plate 32, and the lens unit 33 are arranged to have a predetermined positional relationship.

In particular, the positional relationship between the diffusion plate 32 and the lens unit 33 is arranged such that a distance between the diffusion plate 32 and the lens unit 33 is approximately equal to, and, ideally, exactly equal to a focal length of the lenses 33a and 33b in the lens unit 33.

If the distance between the lens unit 33 and the diffusion plate 32 is close to the focal length of the lenses 33a and 33b, light emitted from the diffusion plate 32 that crosses the optical axis 331 of the lenses 33a and 33b passes through the lenses 33a and 33b and is emitted as substantially parallel light. Further, if the distance between the lens unit 33 and the diffusion plate 32 is equal to the focal length, the emitted light is parallel (collimated) light. Thus, by appropriately arranging the number of light sources 31a and 31b and an arrangement of the light source unit 31, the diffusion plate 32, and the lens unit 33, the symbol read area 8 can be uniformly illuminated with a sufficient brightness.

The reason that the distance between the lens unit 33 and the diffusion plate 32 is preferably set equal to the focal length of the lenses 33a and 33b is now explained with respect to particular examples.

If the distance between the lens unit 33 and the diffusion plate 32 is set approximately equal to the image forming distance of the lenses 33a and 33b, light emitted from the diffusion plate 32 crossing the optical axes of the lenses 33a and 33b passes through the lenses 33a and 33b to be convergent light. Here, the image forming distance is the distance between the lens unit 33 and an image plane at which an image of the symbol read area 8 is formed. With this arrangement, although uniformly-distributed and sufficient illumination may be provided by using an appropriate selection of a number of light sources 31a and 31b and the proper arrangement of the light source unit 31 and the lens unit 33, generally a larger number of light sources 31a and 31b will be required than the case where the distance between the lens unit 33 and the diffusion plate 32 is set to the approximate focal length of the lenses 33a and 33b. Thus, the head portion 11 will be larger and the data symbol reading apparatus 1 will be more expensive to manufacture.

The case in which the distance between the lens unit 33 and the diffusion plate 32 is set approximately equal to the image forming distance of the lenses 33a and 33b is compared with the case in which the distance between the lens unit 33 and the diffusion plate 32 is set approximately equal to the focal length of the lenses 33a and 33b with reference to FIG. 6 below.

If the distance between the lens unit 33 and the diffusion plate 32 is set between the approximate focal length of the lenses 33a and 33b and the approximate image forming distance of the lenses 33a and 33b, similarly, a larger number of light sources 31a and 31b will generally be required to produce the uniformly-distributed, sufficient illumination. Therefore the data symbol reading apparatus must be larger and more expensive.

Further, if the distance between the lens unit 33 and the diffusion plate 32 is made shorter than the approximate focal length of the lenses 33a and 33b, light emitted from the diffusion plate 32 crossing the optical axes 331 of the lenses 33a and 33b passes through the lenses 33a and 33b as diverging light. In this case, when the distance is shorter than, but close to the focal length, the luminance can be made uniform by an appropriate arrangement of the light sources 31a and 31b and the lenses 33a and 33b. However, as the distance becomes much shorter than the focal length, a peripheral portion of the symbol read area 8 (i.e., farther away from a center of the symbol read area 8) becomes darker, i.e., the luminance distribution will become non-uniform.

Lastly, if the distance between the lens unit 33 and the diffusion plate 32 is made longer than the approximate image forming distance of the lenses 33a and 33b, light emitted from the diffusion plate 32 crossing the optical axes 331 of the lenses 33a and 33b has a degree of convergence which is increased as the light passes through the lenses 33a and 33b. Thus, the positions of the light sources 31a and 31b strongly affect the luminance distribution on the symbol read area 8, and the luminance distribution may become non-uniform.

The positional relationship between each of the light sources 31a and 31b and the corresponding lenses 33a and 33b is also important in providing uniform illumination.

In the arrangement of the embodiment, as shown in FIG. 3, the optical axis 331 of the lens 33a coincides with an optical axis 311 of the light source 31a. The optical axis 331 of the lens 33b is offset from the optical axis 311 of the corresponding light source 31b in a direction away from the optical axis 351 of the image pickup lens 35. This arrangement is provided due to a possible overlap of the light provided from each of the light source 31a and the light source 31b passing through the lens 33a. Thus, a large amount of light is transmitted along the optical axis 331 of the light source 31a to the symbol read area 8, and because the light source 31b is arranged outside the light source 31a, a smaller amount of light is transmitted along the optical axis 331 of the light source 31b to the symbol read area 8. As shown in FIG. 3, the amount of light on the symbol read area 8 can be balanced (i.e., to provide uniform illumination), by offsetting the optical axis 331 of the lens 33b outside of the optical axis 311 of the corresponding light source 31b.

In the data symbol reading apparatus 1, the image pickup element 34 is, for example, a photoelectric conversion element for converting an amount of received light into an electric signal. In the embodiment, a CCD (charge coupled device) is used.

As described above, the data symbol reading apparatus 1 further includes the index projection section 4. The index projection section 4 includes an index light source 41 and an index lens 42 for converging light emitted from the index light source 41. The color (wavelength) of light from the index light source 41 may be the same or different from the color of light from the light source unit 31. The index light source 41 and the index lens 42 are arranged to project an index point 9 on the plane of the symbol read area 8, in this case, close to one side of the symbol read area. Further, the index light source 41 and the index lens 42 are arranged such that the index point 9 will be in-focus when the data symbol reading apparatus 1 is held at a distance at which the symbol read area 8 is imaged on the light-receiving surface of the CCD 34. If the distance is too large or short, the index point 9 will appear out-of-focus, that is, will be too large. In this way, a user may adjust the distance until the index point 9 is as small as possible, to confirm that the image of the symbol read area 8 is properly formed on the light-receiving surface of the CCD 34.

As described above, the grip portion 12 of the data symbol reading apparatus 1 houses the processing section 5.

Figure 4:
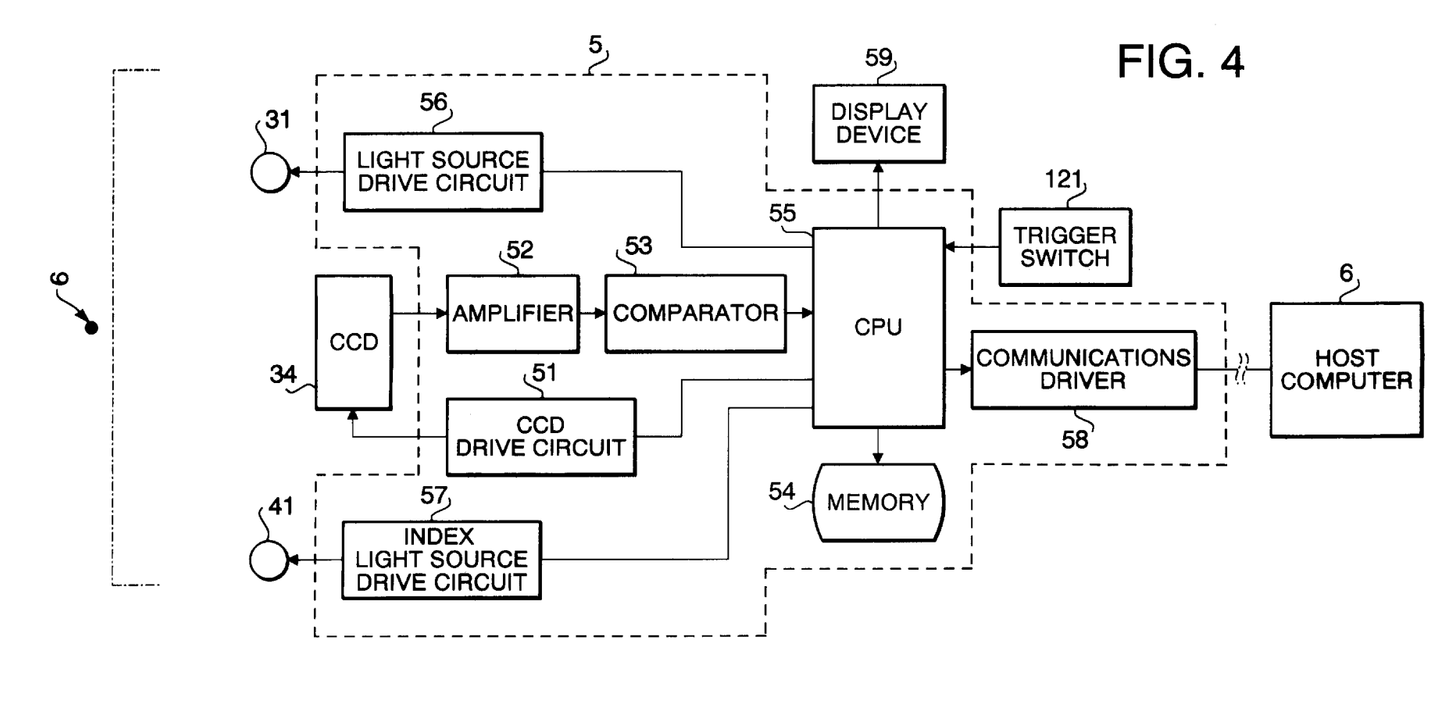
FIG. 4 is a block diagram of the processing section of the data symbol reading apparatus of FIG. 1.

FIG. 4 is a block diagram of the processing section 5. The processing section 5 includes a CCD drive circuit 51, an amplifier 52, a comparator 53, a memory 54, a controller, in this case, a CPU 55, a light source drive circuit 56, an index light source drive circuit 57, and a communications driver 58.

Based on input from the trigger switch 121, the controller 55 controls the light source drive circuit 56 and the index light source drive circuit 57 to drive the light source unit 31 and the index light source 41, respectively. The controller 55 further controls the CCD drive circuit 51 to drive the CCD 34 to capture an image. The captured image signal is amplified by the amplifier 52, binarized by the comparator 53, and sent by the controller 55 to the memory 54. The controller 55 may then output the image signal to a host computer 6 or the like through the communications driver 58.

Further, as shown in FIG. 4, the data symbol reading apparatus 1 may include a display device 59. The display device 59 may be, for example, an LCD (Liquid Crystal Display) mounted on the data symbol reading apparatus 1, or an external CRT connected to the data symbol reading apparatus 1. The display device 59 is connected to the controller 55 for displaying an image or control information.

Figure 5:
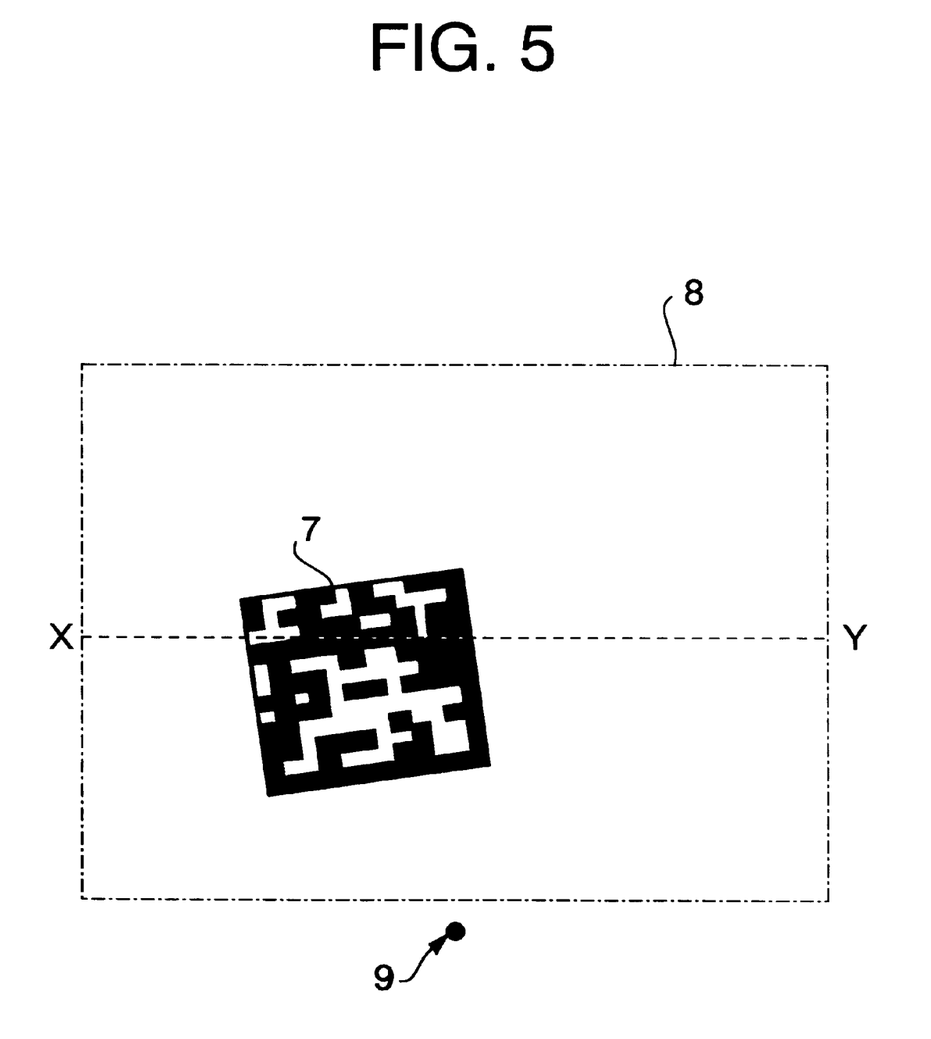
FIG. 5 is a top view of an example data symbol.

FIG. 5 shows an example data symbol 7 to be read. The data symbol 7 includes a mosaic of black and white (or transparent) cells arranged in n (rows)×m (columns) (n and m are integers equal to or greater than 2). In the embodiment, each black cell or white cell represents a 0 or 1 in a binary system such that information is provided by the combination of black cells and white cells in the data symbol 7.

When capturing an image of the data symbol 7, the data symbol reading apparatus 1 is positioned such that an index point 9 from the index light source 41 is in-focus and positioned with respect to the data symbol 7 such that the data symbol 7 will be within the symbol read area 8. The line X-Y in FIG. 5 indicates a luminance distribution measurement line as described below with respect to FIG. 6.

The reading operation of the data symbol reading apparatus 1 will now be described.

In the embodiment, the trigger switch 121 is designed as a two-step switch. When the trigger switch 121 is pushed through a first-step (i.e., to a half-press state), the data symbol reading apparatus 1 is turned ON. When ON, the light source drive circuit 56 and the index light source drive circuit 57 drive the light source unit 31 to illuminate the symbol read area 8 and the index light source 41 to form the index point 9, respectively. A user then positions the index point 9 with respect to the data symbol 7 and adjusts the distance between the data symbol reading apparatus 1 and a plane of the data symbol 7 such that the index point 9 is in focus.

The trigger switch 121 is then pressed through a second-step (i.e., to a full-press state) and the controller 55 controls the CCD drive circuit 51 such that an image signal, representing an image of the symbol read area 8 (including the data symbol 7), is captured. An image-pickup operation can be performed by driving the CCD 34 in a field accumulating mode or a frame accumulating mode.

More specifically, the CCD drive circuit 51 outputs a CCD vertical drive pulse and a CCD horizontal drive pulse to the CCD 34 at a predetermined timing. The CCD vertical drive pulse is used as an operation timing signal of charge accumulation in the CCD 34. The CCD horizontal drive pulse is used as an operation timing signal of charge transfer to the amplifier 52. The CCD drive circuit 51 also generates a clock signal and sends a composite clock signal, obtained by combining a horizontal sync signal and a vertical sync signal with the clock signal, to the controller 55.

Captured image signals (analog signals) sequentially output from the CCD 34 are amplified by the amplifier 52 and converted into digital image signals by an A/D converter (not shown) to be input to the comparator 53. In the comparator 53, the converted digital image signal is compared with a threshold value from the controller (CPU) 55 to be binarized. The binary data output from the comparator 53 is stored at a predetermined address, specified by an address counter (not shown) provided in the controller 55 of the memory 54. The address counter is driven by the composite clock signal from the CCD drive circuit 51.

The image data is then sequentially read from the memory 54 according to addresses designated by the address counter (this may be done in a reverse order from that in which the image data was stored) and is processed in an arithmetic operation section of the controller 55. For example, image processing such as image inversion, profile detection (extraction of only information related to the data symbol 7), dropout correction, and rotation are performed. In addition, a decoder provided in the controller 55 decodes the image data into decoded data corresponding to the type of two-dimensional data symbol 7 (i.e., information represented by the data symbol 7 is decoded). The decoded data or the image data may also be output to the host computer 6 through the communications driver 58 or displayed on the display device 59 by the controller 55.

FIGS. 6A to 6D show luminance distributions along the line X-Y of FIG. 5 of the symbol read area 8 under various conditions.

Figure 6A:
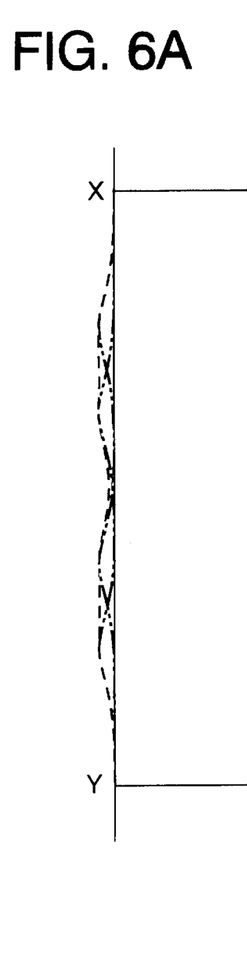
FIGS. 6A through 6D show luminance distributions for a symbol read area under various conditions.

FIG. 6A shows a luminance distribution when the data symbol reading apparatus 1 does not include the lens unit 33. In this case, light emitted from the light source unit 31 is diffused by the diffusion plate 32 such that the light extends over a large area. Since the light is not converged by the lenses 33a and 33b, luminance of the symbol read area 8 is extremely low, and the data symbol 7 cannot be accurately read.

Figure 6B:
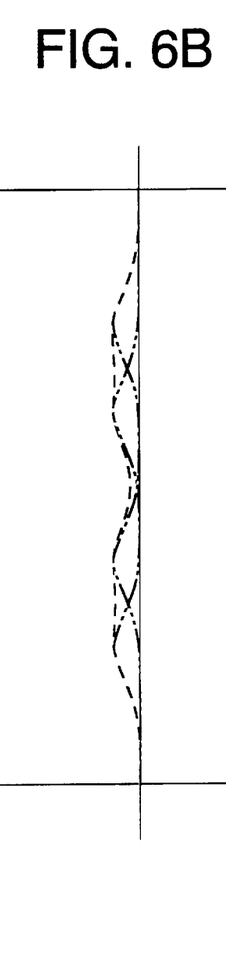

FIG. 6B shows a luminance distribution when the data symbol reading apparatus 1 does not include both the diffusion plate 32 and the lens unit 33. In this case, light emitted from the light source unit 31 is irradiated directly on the symbol read area 8, and the positions of the light sources 31a and 31b are apparent in the luminance distribution, i.e., there are peaks in the luminance distribution which correspond to the physical position of the light sources 31a and 31b. For this reason, the symbol read area 8 has a relatively low, non-uniform luminance distribution, and an error may be generated when the data symbol 7 is read.

Figure 6C:
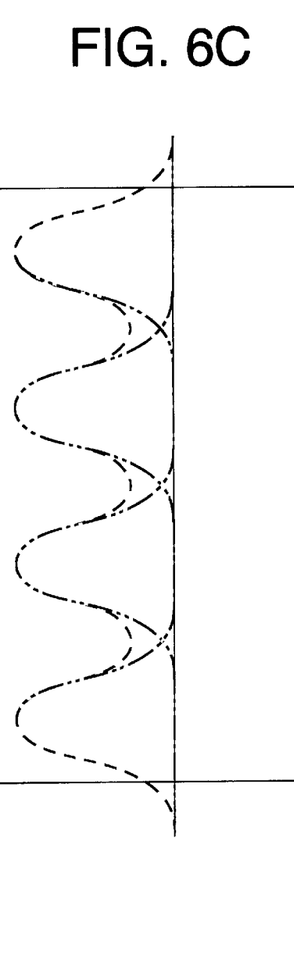

FIG. 6C shows a luminance distribution when the data symbol reading apparatus 1 includes the diffusion plate 32 and the lens unit 33, and a distance between the diffusion plate 32 and the lens unit 33 is equal to the image forming distance of the lenses 33a and 33b. In this case, light emitted from the light source unit 31 is diffused by the diffusion plate 32 and the diffused light is converged by the lenses 33a and 33b. Again, the positions of the light sources 31a and 31b are apparent in the luminance distribution, i.e., there are peaks in the luminance distribution which correspond to the physical position of the light sources 31a and 31b. As described above, such a non-uniform luminance distribution may cause errors to be generated when the data symbol 7 is read. In this case, if the number of light sources 31a and 31b is increased, if a diffusion plate 32 having a higher degree of diffusion is used, or if a distance between the light source unit 31 and the diffusion plate 32 is increased to make illumination on the diffusion plate 32 more uniform, the luminance distribution can be made uniform. However, as explained briefly above, such changes increase the size and cost of the data symbol display device 1.

Figure 6D:
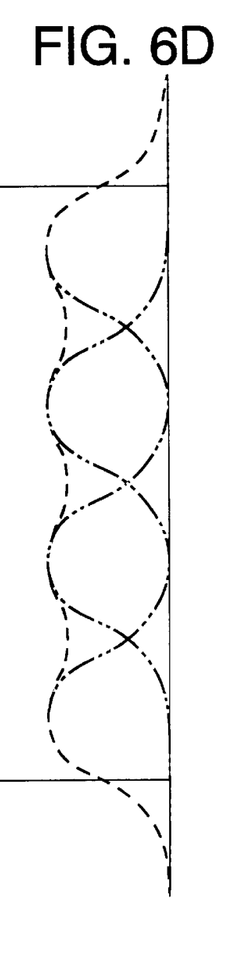

FIG. 6D shows a luminance distribution when the data symbol reading apparatus 1 includes the diffusion plate 32 and the lens unit 33, and the distance between the diffusion plate 32 and the lens unit 33 is equal to the focal length (collimate position) of the lenses 33a and 33b. In this case, light emitted from the light source unit 31 is diffused by the diffusion plate 32 and the diffused light is collimated by the lenses 33a and 33b. Depending on the arrangement of the light sources 31a and 31b and the lenses 33a and 33b, as explained above, the light source 31a may be arranged to irradiate the central portion of the symbol read area 8 and the light source 31b may be arranged to irradiate the peripheral portion of the symbol read area 8. More specifically, the luminance distribution can be arranged such that the peaks of illumination light from the light sources 31a and 31b have equal intervals, and the light from the lenses 33a and 33b is substantially parallel. Therefore, the positions of the light sources 31a and 31b are not as apparent in the luminance distribution, and a uniform luminance can be obtained. Such a luminance distribution is preferable for the data symbol reading apparatus 1 to read the data symbol 7.

As described above, the data symbol reading apparatus 1 according to the present invention provides the symbol read area 8 with sufficient and uniformly-distributed illumination such that the data symbol reading apparatus 1 can precisely read the data symbol 7.

Although the structure and operation of a data symbol reading apparatus is described herein with respect to the preferred embodiments, many modifications and changes can be made without departing from the spirit and scope of the invention.

For example, the distance between the diffusion plate and the lens unit can be adjusted as described above or the optical axis of the light source and the optical axis of the lens may be offset from each other as described above according to the particular requirements of the data symbol reading apparatus. In this manner, the data symbol reading apparatus can be adjusted to provide an optimal luminance distribution at the symbol read area to ensure accurate reading of a data symbol.

The present disclosure relates to subject matter contained in Japanese Patent Application No. HEI 8-244018, filed on Aug. 28, 1996, which is expressly incorporated herein by reference in its entirety.

What is claimed is:

1. An illuminating system for a symbol reading apparatus having an image pickup element and an image forming optical system for forming an image of a symbol located within a symbol read area onto a light-receiving surface of said image pickup element, said illuminating system comprising:
   a plurality of light sources;
   a diffusion plate for diffusing light emitted by said light sources; and
   a lens member for transmitting diffused light diffused by said diffusion plate onto the symbol read area,
   wherein said plurality of light sources, said diffusion plate, and said lens member are arranged such that a light distribution within said symbol reading area is substantially uniform.

2. The illuminating system according to claim 1, wherein said plurality of light sources are arranged on a plane that is perpendicular to an optical axis of said image forming optical system.

3. The illuminating system according to claim 1, wherein said diffusion plate is perpendicular to an optical axis of said image forming optical system, and wherein a distance between said diffusion plate and said lens member is approximately equal to a focal length of said lens member.

4. The illuminating system according to claim 1, wherein a transparent portion is formed on said diffusion plate, and light from said symbol read area passes through said transparent portion to be incident on said image forming optical system.

5. The illuminating system according to claim 4, wherein said transparent portion is an opening.

6. The illuminating system according to claim 1, wherein said lens member includes a plurality of lenses, the number of said plurality of lenses being equal to the number of said plurality of light sources, said plurality of light sources and said plurality of lenses being arranged on opposite sides of said diffusion plate.

7. The illuminating system according to claim 4, wherein said plurality of light sources are arranged to be symmetrical with respect to an optical axis of said image forming optical system.

8. The illuminating system according to claim 1, wherein said diffusion plate is a plate having a coarse surface.

9. An image capture apparatus for capturing an image of a target area, said image capture apparatus comprising:
   an image capture element;
   an illumination system that illuminates said target area for image capture; and
   an image-forming optical system that forms an image of said target area on said image capture element,
   wherein said illumination system includes:
   a plurality of light sources;
   a diffusion plate for diffusing light emitted by said light sources; and
   a lens member for transmitting diffused light diffused by said diffusion plate onto said target area, and
   wherein said plurality of light sources, said diffusion plate, and said lens member are arranged so that light within said target area is distributed substantially uniformly.

10. The image capture apparatus according to claim 9, wherein a transparent portion is formed on said diffusion plate, and light from said target area passes through said transparent portion to be incident on said image forming optical system.

11. The image capture apparatus according to claim 9, wherein said lens member includes a plurality of lenses arranged on a plane perpendicular to an optical axis of said image forming optical system, the number of said plurality of lenses being equal to the number of said plurality of light sources, and said plurality of light sources and said plurality of lenses are arranged to face each other with said diffusion plate disposed therebetween.

12. The image capture apparatus according to claim 11, wherein said plurality of light sources are arranged to be symmetrical with respect to an optical axis of said image forming optical system.

13. The image capture apparatus according to claim 9, wherein said diffusion plate is a plate having a coarse surface.

14. A data symbol reading apparatus for reading an encoded data symbol, said data symbol reading apparatus comprising:
   an image pickup element;
   an image forming optical system for forming an image of said encoded data symbol located within a symbol read area onto a light-receiving surface of said image pickup element; and
   an illumination system, having a plurality of light sources, a diffusion plate for diffusing light emitted from said light sources, and a lens member for transmitting diffused light diffused by said diffusion plate onto said symbol read area, wherein said plurality of light sources, said diffusion plate, and said lens member are arranged such that light within said symbol reading area is distributed substantially uniformly.

15. The encoded data symbol reading apparatus according to claim 14, wherein said plurality of light sources are arranged on a plane that is perpendicular to an optical axis of said image forming optical system.

16. The encoded data symbol reading apparatus according to claim 14, further comprising an index display device for displaying an index for setting a distance between said encoded data symbol and said data symbol reading apparatus.

17. The data symbol reading apparatus according to claim 14, wherein said lens member comprises a plurality of lenses, and wherein the number of lenses is equal to the number of light sources, said light sources and said lenses being arranged in a one-to-one relationship.

18. A data symbol reading apparatus according to claim 14, wherein said diffusion plate is a plate having a coarse surface.

19. A data symbol reading apparatus according to claim 14, wherein said encoded data symbol is two-dimensional tessellated symbol.

20. The data symbol reading device according to claim 14, further comprising a decoding device that decodes said encoded data symbol.

21. A data symbol reading apparatus for reading an encoded data symbol, the data symbol reading apparatus comprising:

an image pickup element;

an image forming optical system for forming an image of the encoded data symbol located within a symbol read area onto a light-receiving surface of the image pickup element; and an illumination system, having a plurality of light sources, a diffusion plate for diffusing light emitted from the light sources, and a lens member for transmitting diffused light diffused by the diffusion plate onto the symbol read area, wherein the plurality of light sources, the diffusion plate, and the lens member are arranged such that light within the symbol reading area is distributed substantially uniformly;

wherein said light sources are arranged to be symmetrical with respect to an optical axis of said image forming optical system on a surface perpendicular to said optical axis, and wherein light sources spaced from the optical axis have an arrangement interval smaller than that of light sources arranged closer to the optical axis.

22. A data symbol reading apparatus for reading an encoded data symbol, the data symbol reading apparatus comprising:

an image pickup element;

an image forming optical system for forming an image of the encoded data symbol located within a symbol read area onto a light-receiving surface of the image pickup element; and an illumination system, having a plurality of light sources, a diffusion plate for diffusing light emitted from the light sources, and a lens member for transmitting diffused light diffused by the diffusion plate onto the symbol read area, wherein the plurality of light sources, the diffusion plate, and the lens member are arranged such that light within the symbol reading area is distributed substantially uniformly;

wherein the lens member comprises a plurality of lenses, and wherein the number of lenses is equal to the number of light sources, the light sources and the lenses being arranged in a one-to-one relationship;

wherein said lenses are arranged to be symmetrical with respect to an optical axis of said image forming optical system on a surface perpendicular to said optical axis, and optical axes of at least one of said lenses does not coincide with optical axes of corresponding ones of said plurality of light sources.

23. The data symbol reading apparatus of claim 22, wherein optical axes of lenses located farther from the optical axis of the image forming optical system do not coincide with optical axes of corresponding ones of the plurality of light sources.

* * * * *